J. Broughton,
Governor.
N° 23,660. Patented Apr. 19, 1859.
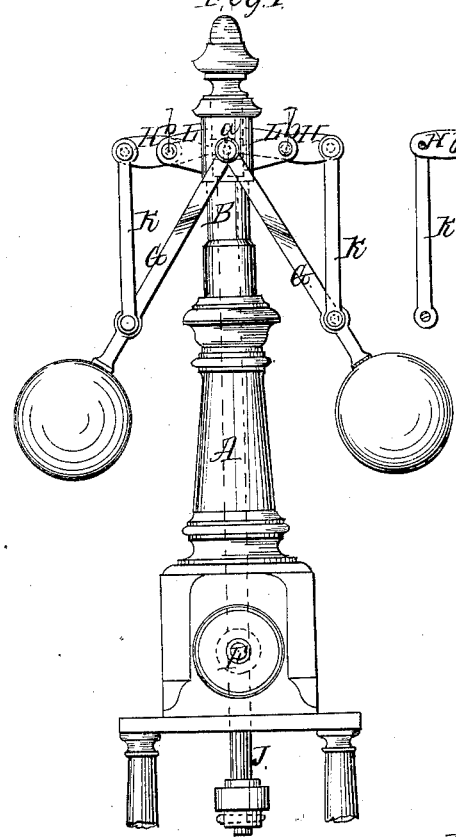
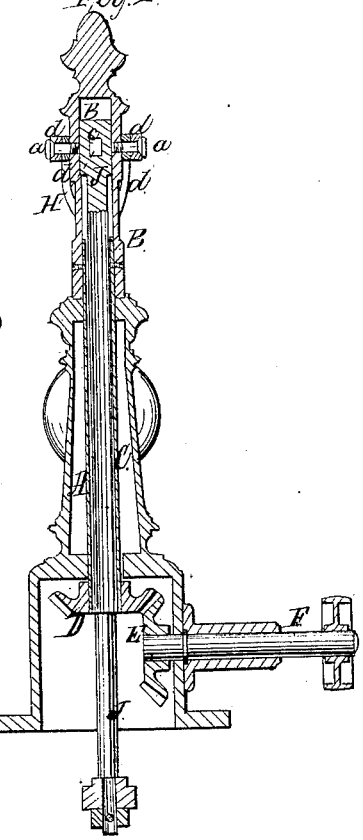
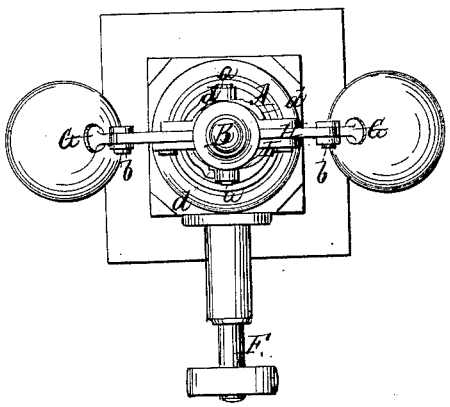
Witnesses
Inventor
John Broughton

UNITED STATES PATENT OFFICE.

JOHN BROUGHTON, OF NEW YORK, N. Y.

GOVERNOR FOR STEAM-ENGINES.

Specification of Letters Patent No. 23,660, dated April 19, 1859.

*To all whom it may concern:*

Be it known that I, JOHN BROUGHTON, of the city, county, and State of New York, have invented a new and useful Improvement in Centrifugal Governors for Steam-Engines and other Motors; and I do hereby declare that the following is a full, clear, and exact description of the same, reference being had to the accompanying drawings, forming part of this specification, in which—

Figure 1, is an elevation of a centrifugal governor with my improvement. Fig. 2, is a central vertical section of the same. Fig. 3, is a plan of the same. Fig. 4, is an elevation partly in section of those parts which more particularly constitute my invention.

Similar letters of reference indicate corresponding parts in the several figures.

My invention relates to that class of centrifugal or ball governors in which the upward motion of the balls imparts a downward motion to the central connecting rod through which the governor acts upon the throttle valve, cut-off gear or other regulator. Such governors as heretofore constructed possess two radical defects, viz. 1st. Owing to the connection of the before-mentioned rod with the ball arms so near to the centers of motion of the arms, a very small vertical movement of the said rod is obtained, as compared with the range of motion of the balls; and 2d. Owing to the points of suspension of the ball arms being distant from the axes of the conical pendulum, the variation in the height of the pendulum and its corresponding variation in speed is not that due to the rise and fall of the balls alone, as the apex of the pendulum changes its position as the balls rise and fall. But for these defects this kind of governor possesses some advantages over other kinds, the most important of which is perhaps the convenient manner in which it can be applied to an engine to regulate the speed by a variable cut-off.

The object of my invention is to remedy these defects and to this end the nature of my invention consists in a certain system of levers and connecting links for effecting the connection between the ball arms and the central rod, by which I am enabled so to apply the ball arms that both oscillate about the same axis intersecting the axis of revolution of the governor and that the point of connection with the ball arms may be as near as desired to the balls and any desired length of movement of the rod as compared with the range of the balls may be obtained.

To enable others skilled in the art to make and use my invention, I will proceed to describe its construction and operation.

A, is the stationary pillar or stand of the governor. B is the revolving head which carries all the working parts, supported in a bearing on the top of the pillar or stand A. This head B is hollow and has secured to its lower part a hollow shaft C, at the lower end of which is a bevel gear D, gearing with another E, on the horizontal driving shaft F.

G, G, are the ball arms, having their upper parts forked as shown at $d$, $d$, Figs. 2 and 3, to embrace the head B, to which the upper extremities of said arms are attached by pins $a$, $a$, screwed or otherwise secured in the head one on each side, the axes of the said pins being in the same line intersecting at right angles the axis of the head B.

H, H are levers working on two parallel horizontal fulcrum pins $b$, $b$, which are supported at about the same height as the pins $a$, $a$, at equal distances from opposite sides of the axis of the head B, in two arms or wings L, L, cast on or otherwise permanently attached to said head. These levers pass through slots in the head B, and their inner extremities enter a slot $c$, in the connecting rod J, which is fitted to work loosely up and down within the head B, and through the hollow shaft C, and the outer ends of said levers are connected by links K, K, with the ball arms G, G. The fulcra $b$, $b$, may be considerably higher or even lower than the axis of oscillation $a$, $a$, of the ball arms.

The operation is as follows: The shaft C, and head B, with its attached ball-arms G, G, levers H, H, links K, K, and rod J, having rotary motion imparted to them through the agency of the shaft F, and gears E, D, the ball-arms rise higher or lower according to the velocity of revolution as in any other governor. An increased velocity of revolution causes said arms G, G, to rise, and thus, through the agency of the connecting links K, K, and levers H, H, produce a descent of the rod J; and a diminished velocity of revolution causes the descent of the arms G, G, and ascent of the rod J, and said rod being connected with the throttle or other valve, cut-off gear or other regulating device is thus made to control the velocity of the engine, or motor.

The links K, K, may be pivoted to the ball arms G, G, at any desired distance from the points of suspension *a*, *a*, or even at the centers of the balls themselves, and hence the full effect due to the whole movement of the balls may be imparted to the levers H, H, which may have their fulcra at any desired relative distance from either end; and hence there is hardly any limit to the amount of movement that may be given to the rod J, by a scarcely perceptible change in the height of the balls.

What I claim as my invention, and desire to secure by Letters Patent, is:

Effecting the connection between the ball-arms G, G, and the central rod J, by means of two levers H, H, and two links K, K, the whole being applied and operating substantially as herein set forth.

JOHN BROUGHTON.

Witnesses:
W. TUSCH,
A. R. MAYTH.